US012666317B2

(12) United States Patent
Li

(10) Patent No.: US 12,666,317 B2
(45) Date of Patent: Jun. 23, 2026

(54) METHOD AND APPARATUS FOR RANDOM ACCESS INDICATION

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 712 days.

(21) Appl. No.: 17/619,034

(22) PCT Filed: Jun. 17, 2019

(86) PCT No.: PCT/CN2019/091601
§ 371 (c)(1),
(2) Date: Dec. 14, 2021

(87) PCT Pub. No.: WO2020/252644
PCT Pub. Date: Dec. 24, 2020

(65) Prior Publication Data
US 2023/0098488 A1      Mar. 30, 2023

(51) Int. Cl.
*H04W 36/00* (2009.01)
*H04W 16/28* (2009.01)
*H04W 36/08* (2009.01)
*H04W 74/0833* (2024.01)

(52) U.S. Cl.
CPC ....... *H04W 36/0058* (2018.08); *H04W 16/28* (2013.01); *H04W 36/0072* (2013.01); *H04W 36/08* (2013.01); *H04W 74/0833* (2013.01)

(58) Field of Classification Search
CPC . H04W 36/08; H04W 16/28; H04W 36/0058; H04W 74/0833; H04W 36/0072; H04W 48/12; H04W 74/006; H04B 7/0691; H04B 7/0695; H04B 7/0874; H04B 7/088
See application file for complete search history.

(56) References Cited

FOREIGN PATENT DOCUMENTS

| | | |
|---|---|---|
| CN | 108347749 A | 7/2018 |
| KR | 20180127191 A | 11/2018 |
| WO | WO 2018083649 A1 | 5/2018 |

OTHER PUBLICATIONS

Japanese Patent Application No. 2021-572643, Office Action dated Mar. 17, 2023, 4 pages.
Japanese Patent Application No. 2021-572643, English translation of Office Action dated Mar. 17, 2023, 4 pages.
Ericsson "Details of beam level measurements to be included in MDT" 3GPP TSG-RAN WG2 #105bis, TDoc R2-1904009, Apr. 2019, 6 pages.
Huawei et al. "Discussion on panel ID and usage" 3GPP TSG RAN WG1 Meeting #97, R1-1907553, May 2019, 6 pages.
(Continued)

*Primary Examiner* — Justin T Van Roie
(74) *Attorney, Agent, or Firm* — Cozen O'Connor

(57) ABSTRACT

A method and apparatus for random access indication. The serving base station sends a random access indication signaling to a terminal. The random access indication signaling is configured to indicate, to the terminal, a target antenna panel and/or a target beam for sending a random access preamble. The terminal receives the random access indication signaling, and determines, according to the random access indication signaling, the target antenna panel and/or target beam for sending the random access preamble.

17 Claims, 6 Drawing Sheets

(56)         References Cited

OTHER PUBLICATIONS

European Patent Application No. 19933490.5 Search and Opinion dated May 18, 2022; 11 pages.

LG Electronics "Discussion on multi-beam based operations and enhancements" 3GPP TSG RAN WG1 Meeting #97; R1-1906731; May 2019; 13 pages.

ZTE "Discussion on NR Mobility Enhancements in Physical Layer" 3GPP TSG RAN WG1 #97; R1-1906423; May 2019; 7 pages.

PCT/CN2019/091601 English translation of the International Search Report dated Mar. 18, 2020, 3 pages.

LG Electronics: "Feature lead summary#2 of Enhancements on Multi-beam Operations", R1-1907768, 3GPP TSG RAN WG1 Meeting #97, May 2019, 34 pages.

Japanese Patent Application No. 2021-572643, Office Action dated Nov. 11, 2022, 4 pages.

Japanese Patent Application No. 2021-572643, English translation of Office Action dated Nov. 11, 2022, 4 pages.

ERICCSON "Inter-cell Handover in NR" 3GPP TSG-RAN WG2 Meeting #96, R2-168730, Nov. 2016, 8 pages.

Ericcson "Measurement related actions upon handover" 3GPP TSG-RAN WG2 #104, R2-1817630, Nov. 2018, 5 pages.

Huawei, Hisilicon "UL Measurements in active state" 3GPP TSG RAN2 Meeting #95bis, R2-167002, Oct. 2016, 5 pages.

Qualcomm Incorporated "Enhancements on Multi-beam Operation" 3GPP TSG-RAN WG1 Meeting #97, R1-1907290, May 2019, 27 pages.

Korean Patent Application No. 10-2022-7000654, Office Action dated Jun. 5, 2024, 9 pages.

Korean Patent Application No. 10-2022-7000654, English translation of Office Action dated Jun. 5, 2024, 10 pages.

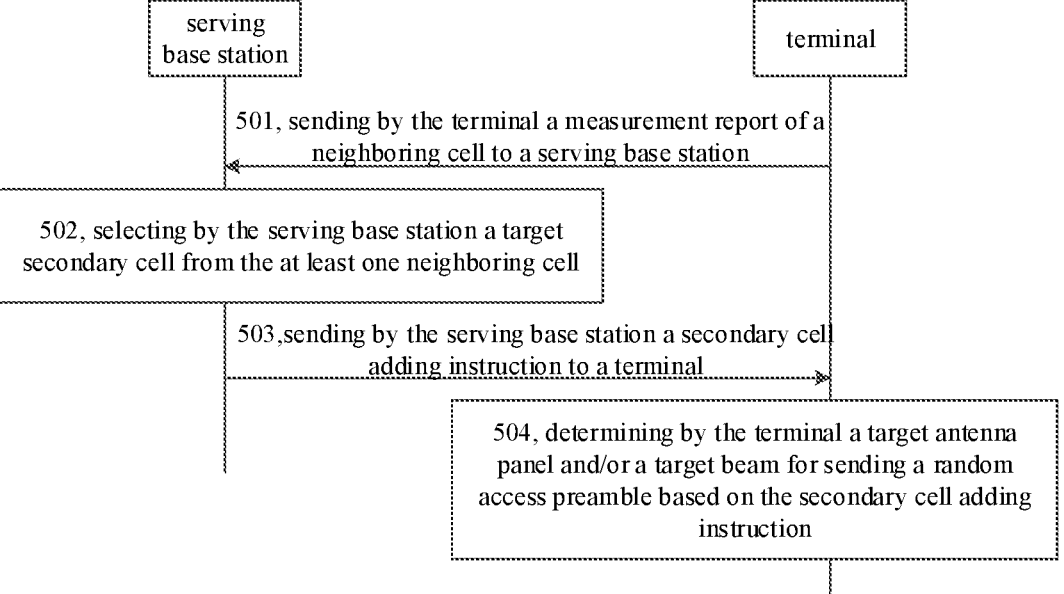

serving
base station terminal 501, sending by the terminal a measurement report of a
neighboring cell to a serving base station 502, selecting by the serving base station a target
secondary cell from the at least one neighboring cell 503,sending by the serving base station a secondary cell
adding instruction to a terminal 504, determining by the terminal a target antenna
panel and/or a target beam for sending a random
access preamble based on the secondary cell adding
instruction

FIG. 5

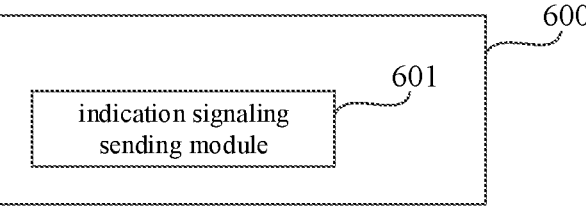

600

601 indication signaling
sending module

METHOD AND APPARATUS FOR RANDOM ACCESS INDICATION

CROSS-REFERENCE TO RELATED APPLICATION

This application is a US national phase application of International Application No. PCT/CN2019/091601, filed on Jun. 17, 2019, the entire content of which is incorporated herein by reference for all purposes.

TECHNICAL FIELD

The present disclosure relates to a field of communications technologies, and particularly to a method and an apparatus for random access indication, and a storage medium.

BACKGROUND

A terminal need to initiate random access to a base station so as to successfully establish a wireless connection with the base station.

In a conventional solution, the terminal generally has only one antenna panel, and the terminal initiates random access to the base station through the antenna panel. In a 5G new radio (NR) system, in order to improve the space diversity gain, the base station and the terminal may each have a plurality of antenna panels. The plurality of antenna panels of the base station may belong to the same transmitter reception point (TRP), or may belong to a plurality of different TRPs.

At present, when there are a plurality of antenna panels on the terminal, no perfect solution exists to address the issue of initiating random access to the base station.

SUMMARY

According to a first aspect of embodiments of the disclosure, a method for random access indication is provided. The method includes: sending by a serving base station a random access indication signaling, wherein the random access indication signaling is configured to indicate to a terminal a target antenna panel and/or a target beam for sending a random access preamble.

According to a second aspect of the embodiments of the disclosure, a method for random access indication is provided. The method includes: receiving by a terminal a random access indication signaling; and determining by the terminal a target antenna panel and/or a target beam for sending a random access preamble based on the random access indication signaling.

According to a third aspect of the embodiments of the disclosure, an apparatus for random access indication is provided. The apparatus is applied to a serving base station, and includes: a processor; and a memory configured to store instructions executable by the processor. The processor is configured to: send a random access indication signaling, wherein the random access indication signaling is configured to indicate to a terminal a target antenna panel and/or a target beam for sending a random access preamble.

According to a fourth aspect of the embodiments of the disclosure, an apparatus for random access indication is provided, and includes: a processor; and a memory configured to store instructions executable by the processor. The processor is configured to: receive a random access indication signaling; and determine a target antenna panel and/or a target beam for sending a random access preamble based on the random access indication signaling.

According to a fifth aspect of embodiments of the disclosure, a non-transitory computer readable storage medium stored with computer programs thereon is provided. The computer programs are configured to implement steps of the method provided in the first aspect of the disclosure when executed by the processor.

According to a sixth aspect of embodiments of the disclosure, a non-transitory computer readable storage medium stored with computer programs thereon is provided. The computer programs are configured to implement steps of the method provided in the second aspect of the disclosure when executed by the processor.

It should be understood that, the above general descriptions and latter detailed descriptions are only illustrative and descriptive, and may not be a limitation of the disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 5 is a flowchart illustrating a method for random access indication according to another example embodiment.

FIG. 6 is a block diagram illustrating an apparatus for random access indication according to an example embodiment.

DETAILED DESCRIPTION

Embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The network architecture and business scenario described in embodiments of the disclosure are intended to explain the technical solution of embodiments of the disclosure more clearly, and does not constitute a limitation to the technical solution provided by embodiments of the disclosure. Those skilled in the art know that, with the evolution of the network architecture and the emergence of new business scenarios, the technical solutions provided in embodiments of the disclosure are equally applied to similar technical problems.

Figure 1:
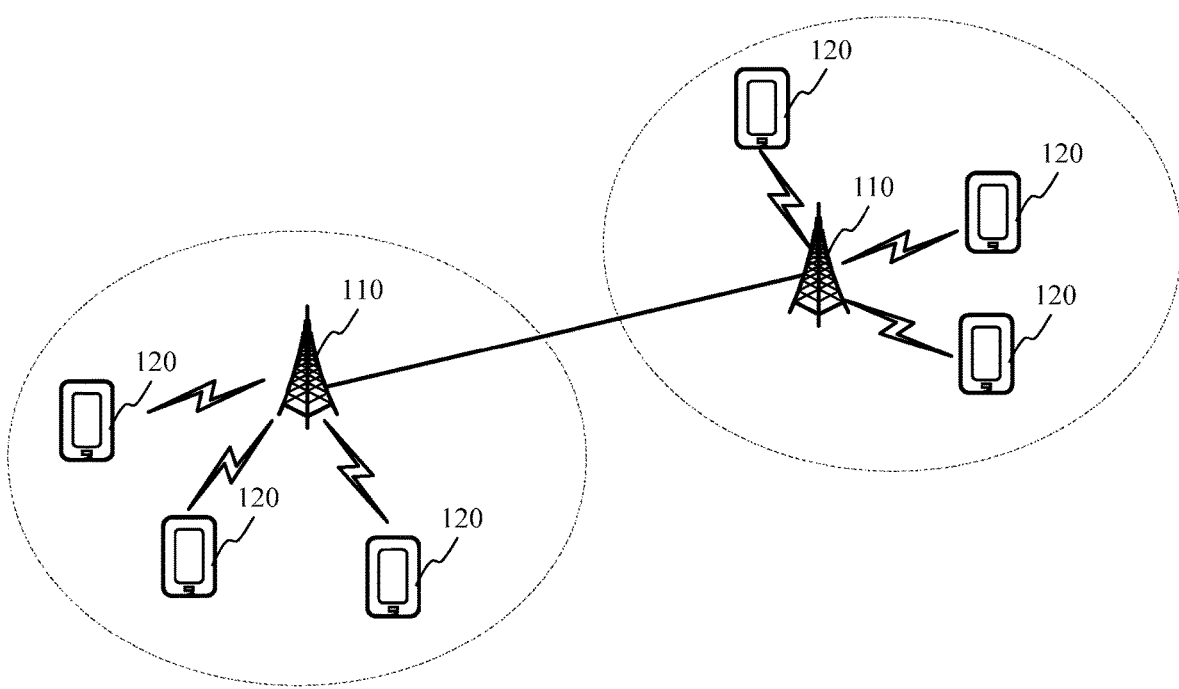
FIG. 1 is a diagram illustrating a network architecture according to an example embodiment.

FIG. 1 is a diagram illustrating a network architecture according to an example embodiment. The network architecture may include a base station 110 and a terminal 120.

The base station 110 is deployed in an access network. The access network in a 5G NR system may be referred to as a new generation-radio access network (NG-RAN). The base station 110 may communicate with the terminal 120 through some kind of air interface technology, for example, a cellar technology.

The base station 110 is an apparatus deployed in an access network to provide a wireless communication function for the terminal 120. The base station 110 may include various forms of macro base stations, micro base stations, relay stations, access points, etc. In the system adopting different wireless access technologies, the name of the devices with a base station function may vary, for example, in a 5G NR system, it is referred to as gNodeB or gNB. With evolution of communication technologies, the name "base station" may vary. For convenience of description, in embodiments of the disclosure, the above apparatus that provides a wireless communication function for a terminal 120 is collectively referred to as a base station. The base station 110 also may be a vehicle device, which is applied to a scenario for communication between vehicles in an Internet of Vehicles. During communication between vehicles, the channel or signaling in the disclosure may be a channel or signaling applied to a sidelink.

The number of the terminals 120 is generally multiple, and one or more terminals 120 may be distributed in cells managed by each base station 110. The terminal 120 may include various handheld devices with a wireless communication function, vehicle devices, wearable devices, computing devices or other processing devices connected to a wireless modem, as well as various forms of user equipment (UE), mobile stations (MS), terminal devices, etc. For convenience of description, in embodiments of the disclosure, the above device is collectively referred to as a terminal. The terminal 120 also may be a vehicle device, which is applied to a scenario for communication between vehicles in an Internet of Vehicles. During communication between vehicles, the channel or signaling in the disclosure may be a channel or signaling suitable for a sidelink.

The "5G NR system" in embodiments of the disclosure also may be referred to as a 5G system or an NR system, the meaning of which may be understood by those skilled in the art. The technical solution in embodiments of the disclosure may be applied to a 5G NR system, and also may be applied to a subsequent evolution system after a 5G NR system.

Figure 2:
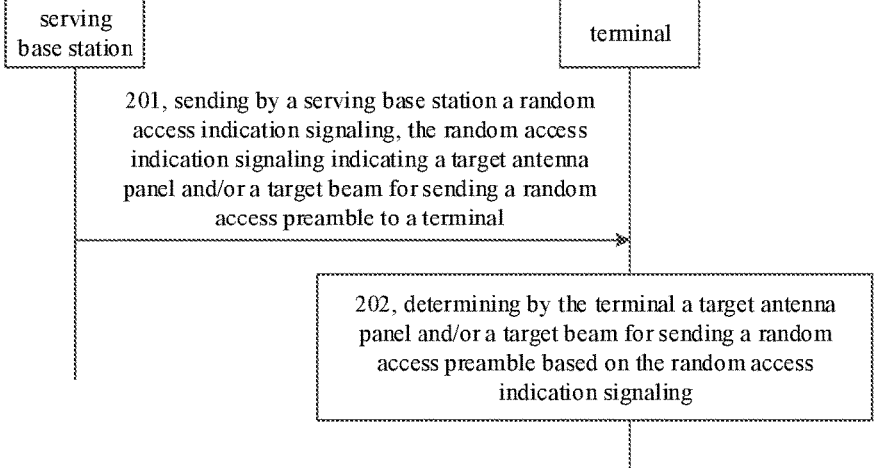
FIG. 2 is a flowchart illustrating a method for random access indication according to an example embodiment.

FIG. 2 is a flowchart illustrating a method for random access indication according to an example embodiment. The method may be applied to a network architecture as illustrated in FIG. 1. The method may include the following steps 201~202.

At step 201, a serving base station sends a random access indication signaling, wherein the random access indication signaling is configured to indicate to a terminal a target antenna panel and/or a target beam for sending a random access preamble.

The serving base station sends the random access indication signaling to the terminal, and correspondingly, the terminal receives the random access indication signaling sent by the serving base station. The serving base station refers to a base station to which a serving cell accessed by the terminal belongs.

When the terminal only accesses one serving cell, the serving base station is the base station to which the serving cell belongs. When the terminal accesses a plurality of serving cells simultaneously, for example, the terminal accesses one primary cell (PCell), and one or more secondary cells (SCell), in this case, if the PCell and the SCell share the same base station, the serving base station is the shared base station, and if the PCell and the SCell do not share the same base station, that is, there is a dual connection, namely, there is a peNB and an SeNB, the serving base station may be the base station to which the PCell belongs, and may also be the base station to which the primary secondary cell (PSCell) belongs.

In embodiments of the disclosure, the terminal has at least two antenna panels, and each antenna panel includes at least one beam. Based on the random access indication signaling, the serving base station indicates to the terminal the target antenna panel and/or the target beam for sending the random access preamble. The target antenna panel may include one antenna panel, and also may include a plurality of antenna panels. The target beam may be one beam, and also may include a plurality of beams. When the target beam include a plurality of beams, the plurality of beams may belong to the same antenna panel, and also may belong to a plurality of different antenna panels. When the random access indication signaling includes a plurality of target antenna panels and a plurality of target beams simultaneously, it requires to indicate the target antenna panel corresponding to each target beam clearly.

Optionally, the random access indication signaling includes indication information of the target antenna panel and/or the target beam, and the indication information is configured to represent the target antenna panel and/or the target beam.

In an example, the indication information includes an identifier of the target antenna panel and/or an identifier of the target beam. That is, the random access indication signaling includes an identifier of the target antenna panel and/or an identifier of the target beam. The identifier of the target antenna panel is configured to uniquely indicate the target antenna panel, and different antenna panels have different identifiers. The identifier of the antenna panel may be denoted as a panel ID, which may be a character string including at least one of numbers, letters, and characters. The identifier of the target beam is configured to uniquely indicate the target beam, and different beams have different identifiers. The identifier of the beam may be denoted as a beam ID, which may be a character string including at least one of numbers, letters, and characters. For example, the random access indication signaling includes panel #1 and beam #5, thereby indicating to the terminal that the target antenna panel for sending the random access preamble is an antenna panel numbered 1, and the target beam for sending the random access preamble is a beam numbered 5.

In another example, the indication information includes an identifier of the target antenna panel and/or a second reference signal identifier. That is, the random access indication signaling includes the identifier of the target antenna panel and/or the second reference signal identifier. The second reference signal identifier is configured to indicate the target beam. The terminal may determine the target beam for sending the random access preamble based on the second reference signal identifier. The second reference signal identifier is an identifier of a second reference signal, and the second reference signal may be an uplink reference signal, for example, a sounding reference signal (SRS), and also may be a downlink reference signal, such as a synchronization signal block (SSB) or a channel state information-reference signal (CSI-RS). When the second reference signal is an uplink reference signal, the serving base station notifies the terminal to use the sending beam for sending the uplink reference signal, as the target beam for sending the random access preamble. When the second reference signal is a downlink reference signal, the serving base station notifies the terminal to use the sending beam corresponding to the receiving beam for receiving the downlink reference signal, as the target beam for sending the random access preamble. For example, the random access indication signaling includes panel #1 and SRS #1, thereby indicating to the terminal that the target antenna panel for sending the random access preamble is an antenna panel numbered 1, and the target beam for sending the random access preamble is a sending beam for sending the SRS #1. For example, the random access indication signaling includes panel #1 and SSB #1, thereby indicating to the terminal that the target antenna panel for sending the random access preamble is an antenna panel numbered 1, and the target beam for sending the random access preamble is a sending beam corresponding to the receiving beam for receiving the SSB #1.

In another example, the indication information includes a second reference signal group (group or set) identifier and/or a second reference signal identifier. That is, the random access indication signaling includes a second reference signal group identifier and/or a second reference signal identifier. The second reference signal group identifier is configured to indicate the target antenna panel, and the second reference signal identifier is configured to indicate the target beam. The terminal can determine the target antenna panel for sending the random access preamble based on the second reference signal group identifier. The second reference signal group identifier may be an identifier of a second reference signal group, and the second reference signal group may include at least one reference signal. The terminal can determine the target beam for sending the random access preamble based on the second reference signal identifier. The second reference signal identifier is an identifier of a second reference signal. The reference signal here may be an uplink reference signal or a downlink reference signal.

In another example, the indication information includes the second reference signal identifier. That is, the random access indication signaling includes the second reference signal identifier. The second reference signal identifier is configured to indicate the target antenna panel and/or the target beam. The terminal can determine the target antenna panel and/or the target beam for sending the random access preamble based on the second reference signal identifier. The second reference signal identifier is an identifier of a second reference signal. In this case, when the identifier of the reference signal on each antenna panel is different, the target antenna panel and/or the target beam for sending the random access preamble can be determined based on the second reference signal identifier.

At step 202, the terminal determines the target antenna panel and/or the target beam for sending the random access preamble based on the random access indication signaling.

After receiving the random access indication signaling, the terminal can determine the target antenna panel and/or the target beam for sending the random access preamble based on the random access indication signaling, and send the random access preamble with the target antenna panel and/or the target beam, thereby initiating random access to a network side.

Optionally, when the random access indication signaling only indicates the target antenna panel, the terminal sends the random access preamble with the target antenna panel. In this case, when the target antenna panel includes only one beam, the terminal sends the random access preamble with the beam; when the target antenna panel includes a plurality of beams, the terminal may select at least one beam from the plurality of beams to send the random access preamble.

Optionally, when the random access indication signaling only indicates the target beam, the terminal can determine the target antenna panel to which the target beam belongs based on the mapping relationship between the antenna panel and the beam, so as to determine the target antenna panel and the target beam for sending the random access preamble.

Optionally, when the random access indication signaling indicates the target antenna panel and the target beam, the terminal can directly determine the target antenna panel and the target beam for sending the random access preamble based on the random access indication signaling.

For example, when the random access indication signaling includes panel #0, the terminal sends the random access preamble with the antenna panel numbered 0, and further sends the random access preamble with at least one beam on the antenna panel numbered 0. For another example, the random access indication signaling includes beam #1, assuming that the beam #1 belongs to panel #1, the terminal sends the random access preamble with the beam numbered 1 on the antenna panel numbered 1. For another example, the random access indication signaling includes panel #1 and beam #1, the terminal sends the random access preamble with the beam numbered 1 on the antenna panel numbered 1.

Optionally, the random access indication signaling further includes an identifier of the target cell. The target beam refers to a cell to which the terminal is going to initiate random access. The identifier of the target cell is configured to uniquely indicate the target cell, and different cells have different identifiers. The identifier of the cell may be denoted as a cell ID, which may be a character string including at least one of a number, a letter, and a character. The terminal may know which cell to initiate random access after obtaining the identifier of the target cell.

Optionally, the random access indication signaling further includes indication information of an antenna panel and/or a beam configured to monitor a random access response (RAR) after the terminal sends the random access preamble. The implementation form of indication information of the antenna panel and/or the beam configured to monitor the RAR may be the same as the implementation form of above indication information of the target antenna panel and/or the target beam. For example, the antenna panel configured to monitor the RAR may be indicated by the identifier of the antenna panel, and also may be indicated by the reference signal group identifier, and also may be indicated by the reference signal identifier; the beam configured to monitor the RAR may be indicated by the identifier of the beam, and also may be indicated by the reference signal identifier. Here, the reference signal may also be an uplink reference signal or a downlink reference signal. In this way, the terminal can monitor the RAR fed back by the network side with a correct antenna panel and beam after sending the random access preamble, thereby improving random access efficiency.

In summary, in the technical solution provided in embodiments of the disclosure, the serving base station sends the random access indication signaling to the terminal, so that the terminal can determine the target antenna panel and/or the target beam for sending the random access preamble. Accordingly; in this way, when the terminal has a plurality of antenna panels, the terminal can accurately determine which antenna panel is used to initiate random access, thereby improving the accuracy and success rate of random access, and reducing the delay of random access.

When there are a plurality of antenna panels on the terminal, the scenarios where the terminal initiates random access include:

(1) all antenna panels of the terminal are handed over to the target cell, and one or more antenna panels are selected to send the random access preamble to a target cell;

(2) in all antenna panels of the terminal, one or more specific antenna panels are handed over to the target cell, and one or more antenna panels are selected from the one or more specific antenna panels to send the random access preamble to the target cell. Here, the target cell is a cell where the terminal is to be in after handover;

(3) the terminal finds that a radio link failure or a beam failure occurs on a certain antenna panel of the serving cell, and the random access preamble is sent to the target cell with the target antenna panel of the terminal, where the target cell is actually the serving cell; at this time, the target antenna panel refers to an antenna panel used when the terminal receives downlink information (a downlink reference signal and/or a downlink control signaling) sent by the base station antenna panel where the radio link failure or the beam failure occurs;

(4) when the terminal accesses a certain PCell, and needs to add an SCell, one or more antenna panels are selected from the antenna panels of the terminal to send the random access preamble to the target cell. Here, the target cell is the SCell to be added.

For the above different scenarios, the corresponding methods for random access indication are described below.

For the scenario (1), the random access indication signaling is a handover instruction, and the handover instruction is configured to instruct the terminal to hand over to the target cell. Optionally, the handover instruction includes an identifier of the target cell, and further includes indication information of the target antenna panel and/or the target beam. Accordingly, the terminal can determine to send the random access preamble with the target antenna panel and/or the target beam, achieving initiating random access to the target cell.

Figure 3:
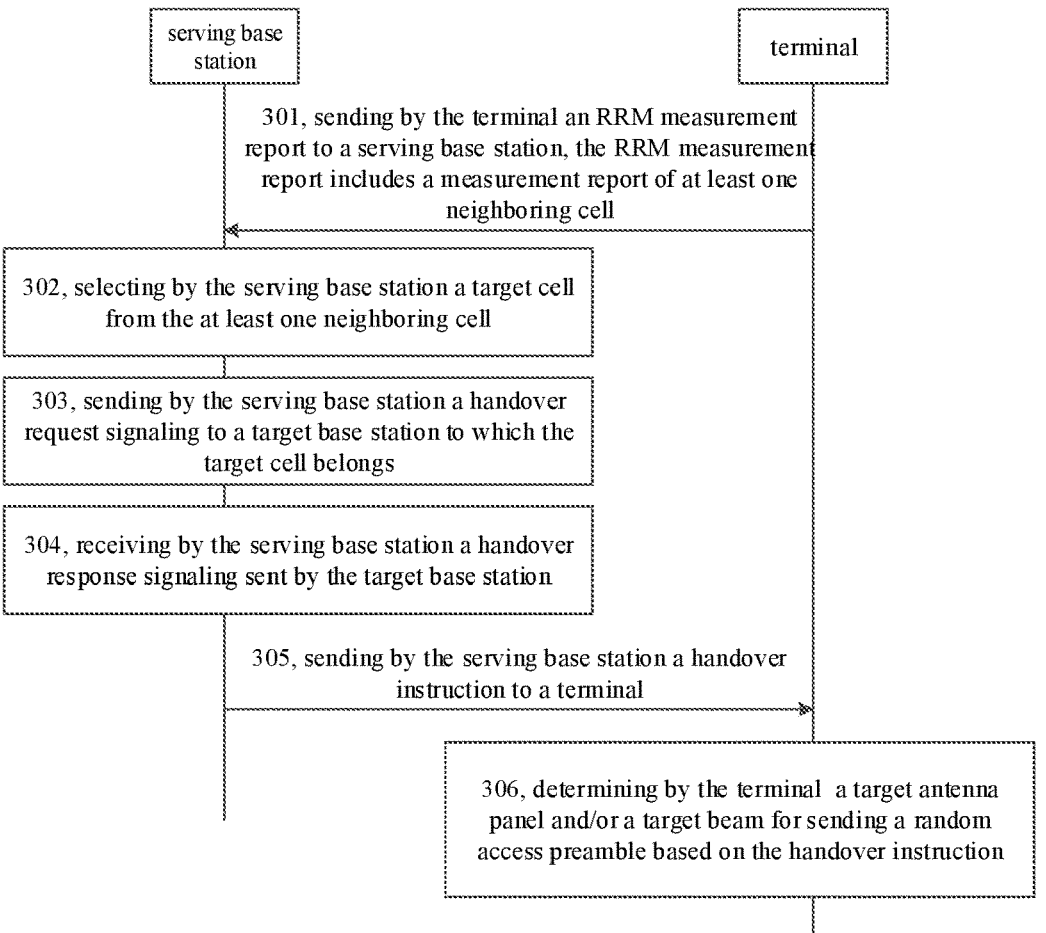
FIG. 3 is a flowchart illustrating a method for random access indication according to another example embodiment.

As illustrated in FIG. 3, for the scenario (1), the method for random access indication provided in embodiments of the disclosure may include the following steps 301~306.

At step 301, the terminal sends an RRM measurement report to the serving base station, in which the RRM measurement report includes a measurement report of at least one neighboring cell.

When the terminal measures a neighboring cell and a serving cell, and finds that the measurement value of the neighboring cell satisfies a certain measurement report triggering event, such as an Event A3 that the measurement value of the neighboring cell is one offset greater than the measurement value of the serving cell, the terminal may send the RRM measurement report to the serving base station, and correspondingly, the serving base station receives the RRM measurement report sent by the terminal. The RRM measurement report is configured to report the radio signal quality of the serving cell and/or the neighboring cell.

The RRM measurement report includes the measurement report of at least one neighboring cell. The measurement report of the neighboring cell is configured to indicate the radio signal quality of the neighboring cell. The measurement report of the neighboring cell may include: an identifier of the neighboring cell, the measurement value of the neighboring cell, and measurement object information.

The measurement value of the neighboring cell is configured to indicate the radio signal quality of the neighboring cell. For example, the measurement value includes but is not limited to at least one of a reference signal received power (RSRP), a reference signal received quality (RSRQ), a signal to interference plus noise ratio (SINR). The RSRP may include L1-RSRP and/or L3-RSRP, the RSRQ includes L1-RSRQ and/or L3-RSRQ, and the SINR includes L1-SINR and/or L3-SINR. L1 (Layer 1) refers to an instantaneous sampling value at a physical layer, and L3 (Layer 3) refers to an average value in a sliding window at an RRM layer, for example, a weighted average value.

The measurement object information is configured to indicate a receiving antenna panel and/or a receiving beam used by the terminal to obtain the measurement value of the neighboring cell. When the terminal performs a signal measurement on the neighboring cell, any receiving beam of any receiving antenna panel may be used, and only when the receiving antenna panel and/or the receiving beam given in the measurement object information are used, the measurement value is maximum or satisfies a certain condition (for example, exceeding a preset threshold value). Thus, the receiving antenna panel and/or the receiving beam given in the measurement object information is the receiving antenna panel and/or the receiving beam when the terminal obtains the measurement value of the neighboring cell given in the measurement report, via which a downlink reference signal issued by the neighboring cell is received, and then the measurement value corresponding to the downlink reference signal is obtained.

In an example, the indication object information includes an identifier of the receiving antenna panel and/or an identifier of the receiving beam. For example, the measurement object information includes panel #0 and beam #3, which represents that the receiving antenna panel used by the terminal to perform a signal measurement on the neighboring cell is the antenna panel numbered 0, and the receiving beam used by the terminal to perform a signal measurement on the neighboring cell is beam numbered 3.

In another example, the indication object information includes an identifier of the receiving antenna panel and/or a first reference signal identifier. The first reference signal identifier is configured to indicate the receiving beam. The serving base station can determine the receiving beam used by the terminal to perform the signal measurement based on the first reference signal identifier. The first reference signal identifier is an identifier of a first reference signal. The first reference signal may be a downlink reference signal, such as an SSB or a CSI-RS, and also may be an uplink reference signal, such as an SRS. When the first reference signal is a downlink reference signal, the terminal notifies the serving base station: the terminal measures the signal with the receiving beam for receiving the downlink reference signal; when the first reference signal is an uplink reference signal, the terminal notifies the serving base station: the terminal measures the signal with the receiving beam corresponding to the sending beam for sending the uplink reference signal. For example, the measurement object information includes panel #0 and SSB #1, which represents that the receiving antenna panel used by the terminal to perform the signal measurement on the neighboring cell is the antenna panel numbered 0, and the receiving beam used by the terminal to perform the signal measurement on the neighboring cell is a beam for receiving the SSB #1. For another example, the measurement object information includes panel #0 and SRS #1, which represents that the receiving antenna panel used by the terminal to perform a signal measurement on the neighboring cell is the antenna panel numbered 0, and the receiving beam used by the terminal to perform the signal measurement on the neighboring cell is a receiving beam corresponding to the sending beam for sending the SSB #1.

In another example, the measurement object information includes a first reference signal group (or set) identifier and/or a first reference signal identifier. The first reference signal group identifier is configured to indicate the receiving antenna panel, and the first reference signal identifier is configured to indicate the receiving beam. The serving base station can determine the receiving antenna panel used by the terminal to perform the signal measurement, based on the first reference signal group identifier. The first reference signal group identifier may be an identifier of a first reference signal group, and the first reference signal group may include at least one reference signal. The serving base station can determine the receiving beam used by the terminal to perform the signal measurement, based on the first reference signal identifier. The first reference signal identifier is an identifier of a first reference signal. The reference signal here also may be a downlink reference signal or an uplink reference signal.

In another example, measurement object information includes a first reference signal identifier. The first reference signal identifier is configured to indicate the receiving antenna panel and/or the receiving beam. The serving base station can determine the receiving antenna panel and/or the receiving beam used by the terminal to perform the signal measurement, based on the first reference signal identifier. The first reference signal identifier is an identifier of a first reference signal. In this case, when the identifier of the reference signal on each antenna panel is different, the receiving antenna panel and the receiving beam may be determined based on the first reference signal identifier.

In an example, assuming that the measurement report of a certain neighboring cell includes: Cell ID #1, panel #0, beam #3 and RSRP, it represents that the terminal measures a downlink reference signal issued by the neighboring cell with the receiving antenna panel panel #0 and the receiving beam beam #3, and the obtained measurement value is RSRP, which may be represented by a specific numerical value to reflect the radio signal quality of the neighboring cell.

It should be noted that the RRM measurement report may include measurement reports of one or more neighboring cells, however, the measurement results of the neighboring cells need to satisfy a certain condition, for example, the measurement value of the neighboring cell is greater than a threshold, or compared with the measurement value of the serving cell, the measurement value of the neighboring cell is greater by more than one offset. In other words, when the measurement result of a certain neighboring cell does not satisfy the above condition, the RRM measurement report does not carry the measurement report of the neighboring cell, and when no neighboring cell satisfies the above condition, the terminal will not send the RRM measurement report.

Optionally, the RRM measurement report further includes the measurement report of the serving cell, which is configured to indicate the radio signal quality of the serving cell. The content of the measurement report of the serving cell may be similar to the content of the measurement report of the neighboring cell, which will not be repeated here.

At step 302, the serving base station selects a target cell from the at least one neighboring cell.

Optionally, the serving base station selects a neighboring cell with the optimal radio signal strength as the target cell, based on the measurement values of respective neighboring cells.

At step 303, the serving base station sends a handover request signaling to a target base station to which the target cell belongs.

The handover request signaling is configured to request a handover to the target cell. Optionally, the handover request signaling includes the measurement report of the target cell, for example, including an identifier of the target cell, the measurement value of the target cell, and measurement object information.

After receiving the handover request signaling, the target base station sends a handover response signaling to the serving base station when agreeing that the terminal hands over to the target cell.

At step 304, the serving base station receives the handover response signaling sent by the target base station.

Optionally, the handover response signaling includes indication information of the target antenna panel and/or the target beam. That is, the target base station determines the target antenna panel and/or the target beam used by the terminal for sending the random access preamble when initiating random access to the base station, and notifies serving base station by carrying the information in the handover response signaling. Then the serving base station notifies the terminal.

The indication information of the target antenna panel and/or the target beam is configured to represent the target antenna panel and/or the target beam.

As mentioned in embodiments of FIG. 2, the indication information may have various implementation forms. The indication information may include an identifier of the target antenna panel and/or an identifier of the target beam, or include an identifier of the target antenna panel and/or a second reference signal identifier, or include a second reference signal group identifier and/or a second reference signal identifier, or include a second reference signal identifier. The specific form of indication information included in the handover response signaling depends on the form of the measurement object information in the measurement report sent by the terminal. Optionally, the form of indication information included in the handover response signaling is the same as the form of the measurement object information in the measurement report. For example, when the measurement object information in the measurement report includes the identifier of the receiving antenna panel and/or the identifier of the receiving beam, the indication information in the handover response signaling includes the identifier of the target antenna panel and/or the identifier of the target beam. For another example, when the measurement object information in the measurement report includes the identifier of the receiving antenna panel and/or the first reference signal identifier, the indication information in the handover response signaling includes the identifier of the target antenna panel and/or the second reference signal identifier.

In a possible case, when the terminal has a beam correspondence capability, that is, when the terminal receives a downlink signal sent by the base station, the sending antenna panel and/or the sending beam corresponding to the receiving antenna panel and/or the receiving beam with the optimal signal are the optimal selection when the target base station sends an uplink signal. For example, when the terminal receives a downlink signal sent by the target base station, the receiving antenna panel with the optimal wireless signal strength is panel #1 and the receiving beam is beam #1, and the sending antenna panel corresponding to the receiving antenna panel panel #1 is panel #1, and the sending beam corresponding to the receiving beam beam #1 is beam #4. In this case, when the terminal sends the random access preamble to the target base station with the panel #1 and the beam #4, the receiving signal of the target base station also shall be the strongest. In this case, when the target base station knows the optimal receiving antenna panel and the optimal receiving beam for the terminal to communicate with it based on the measurement report, correspondingly, the target base station also knows the optimal sending antenna panel and the optimal sending beam for the terminal to communicate with it, which are taken as the target antenna panel and the target beam used by the terminal for sending the random access preamble to the target base station.

In another possible case, when the terminal does not have a beam correspondence capability, that is, the terminal cannot directly find the corresponding sending antenna panel and the sending beam based on the receiving antenna panel and the receiving beam, the serving base station may further include configuration information of an uplink reference signal used by the terminal for uplink measurement in the handover request signaling sent by the serving base station to the target base station. After obtaining the configuration information, the target base station measures an uplink reference signal sent by the terminal to obtain a measurement value corresponding to each uplink reference signal, further to find the sending antenna panel and the sending beam with the optimal measurement value as the target antenna panel and the target beam used when the terminal sends the random access preamble to the target base station.

At step 305, the serving base station sends a handover instruction to the terminal.

Optionally, the handover instruction includes an identifier of a target cell, and further includes indication information of the target antenna panel and/or the target beam. Optionally, the handover instruction further includes indication information of an antenna panel and/or a beam configured to monitor an RAR after the terminal sends the random access preamble.

At step 306, the terminal determines the target antenna panel and/or the target beam for sending the random access preamble based on the handover instruction.

After receiving the handover instruction, the terminal can determine the target cell to which random access is initiated, and determine the target antenna panel and/or the target beam for sending the random access preamble, and send the random access preamble to the target base station to which the target cell belongs with the target antenna panel and/or target beam, thereby initiating random access.

In addition, the number of the target antenna panel may be one or more, and the number of the target beam may also be one or more.

The serving base station and the target base station may be the same or different, which are not limited here.

For the scenario (1), the terminal sends an RRM measurement report to the serving base station, and the serving base station finds the neighboring cell with the optimal signal strength as the target cell to which the terminal is handed over, and the target base station to which the target cell belongs determines the target antenna panel and the target beam used by the terminal for sending the random access preamble, so that the terminal can initiate random access to the target cell with the optimal signal strength, and the terminal can use the optimal sending antenna panel and the optimal sending beam for initiating random access to the target cell, thereby fully ensuring a success rate of random access during cell handover.

For the scenario (2), similar with the scenario (1), the random access indication signaling is a handover instruction. Different from the scenario (1), in the scenario (2), only a part of specific antenna panels on the terminal are handed over to the target cell, for example, the terminal may reserve a part of antenna panels to communicate with the current serving cell, and hand over another part of antenna panels to another target cell. In this case, the terminal further needs to send candidate panel information to the serving base station, in which the candidate panel information is configured to indicate at least one candidate antenna panel for random access. The serving base station sends the candidate panel information to the target base station, so that the target base station selects the target antenna panel from the at least one candidate antenna panel.

For example, the terminal has 3 antenna panels, which are panel #0, panel #1 and panel #2 respectively, and the terminal selects the panel #0 and the panel #2 to be handed over to the target cell, and keeps the panel #1 unchanged, in this case, the candidate panel information sent by the terminal to the serving base station may include identifiers of the two candidate antenna panels, such as panel #0 and panel #2, then the target base station selects one or more antenna panels from the two candidate panels as the target antenna panel used by the terminal for sending the random access preamble to the target base station, for example, the target base station selects the panel #0 as the target antenna panel used by the terminal to send the random access preamble.

For the scenario (2), the terminal sends candidate panel information to a network side, so that the target base station selects the target antenna panel for sending the random access preamble from a plurality of candidate antenna panels that need to be handed over determined from the terminal, ensuring that the terminal initiates random access with a suitable antenna panel, thereby improving the accuracy and success rate of random access.

For the scenario (3), the random access indication signaling is a radio link recovery instruction or a beam recovery instruction. The radio link recovery instruction is configured to trigger the terminal to initiate a radio link recovery procedure, and the beam recovery instruction is configured to trigger the terminal to initiate a beam recovery procedure. Optionally, the radio link recovery instruction or the beam recovery instruction includes indication information of the target antenna panel and/or the target beam, so that the terminal initiates random access to the target base station (such as the serving base station) with the target antenna panel and/or the target beam, to perform radio link recovery or beam recovery.

Figure 4:
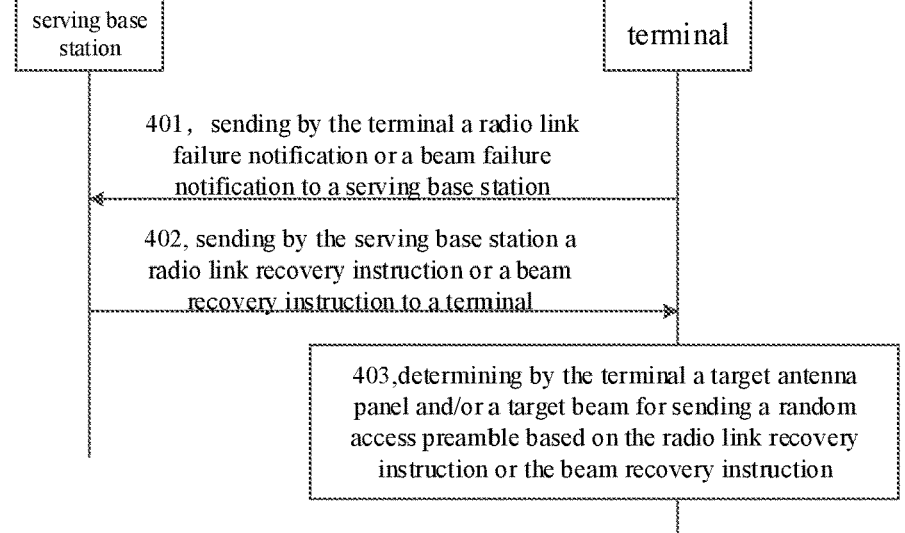
FIG. 4 is a flowchart illustrating a method for random access indication according to another example embodiment.

As illustrated in FIG. 4, for the scenario (3), the method for random access indication provided in embodiments of the disclosure may include the following steps 401~403.

At step 401, the terminal sends the radio link failure notification or the beam failure notification to the serving base station.

The radio link failure notification is configured to notify the serving base station of a base station antenna panel where a radio link failure occurs, that is, to notify the serving base station of which antenna panel/antenna panels of the serving base station has occurred the radio link failure. The beam failure notification is configured to notify the serving base station of a base station antenna panel where a beam failure occurs, that is, to notify the serving base station of which antenna panel/antenna panels of the serving base station has occurred the beam failure. Optionally, the radio link failure notification or the beam failure notification may include indication information of the base station antenna panel where the radio link failure or the beam failure occurs. The indication information of the base station antenna panel herein may be an identifier of the base station antenna panel, or may be represented by a reference signal group identifier and/or a reference signal identifier, and the reference signal may be a downlink reference signal or an uplink reference signal. For example, when the indication information is an identifier of the downlink reference signal, the base station learns that a beam failure occurs on the TRP or the antenna panel for sending the downlink reference signal, in this case, the base station needs to send a downlink control signaling to the terminal in a new beam direction with the antenna panel.

At step 402, the serving base station sends a radio link recovery instruction or a beam recovery instruction to the terminal.

When the terminal sends the radio link failure notification to the serving base station, the serving base station sends the radio link recovery instruction to the terminal; when the terminal sends the beam failure notification to the serving base station, the serving base station sends the beam recovery instruction to the terminal.

Optionally, the radio link recovery instruction or the beam recovery instruction includes indication information of the target antenna panel and/or the target beam. Optionally, the target antenna panel refers to an antenna panel used by the terminal to receive downlink information (for example, a downlink reference signal and/or a downlink control signaling) sent by the base station antenna panel where the radio link failure or the beam failure occurs. Similarly, the indication information of the target antenna panel herein may be an identifier of the target antenna panel, or may be represented by a reference signal group identifier and/or a reference signal identifier, and the reference signal may be a downlink reference signal or an uplink reference signal. For example, when the indication information is an identifier of the downlink reference signal, the terminal learns that the base station needs the terminal to initiate random access to the TRP or the antenna panel of the base station for sending the downlink reference signal with a new beam direction, so that the base station obtains a new beam direction for sending the downlink control signaling to the terminal.

When the terminal does not send the random access preamble to the serving cell with the above target antenna panel, but for example, sends a scheduling request (SR) with a physical uplink control channel (PUCCH), or sends a medium access control (MAC) control element (CE) signaling with a physical uplink shared channel (PUSCH), or sends the random access preamble with other serving cells or other antenna panels, to notify the serving base station of the radio link failure or the beam failure of the base station antenna panel, then after receiving the radio link failure notification or the beam failure notification, the serving base station needs to notify the terminal to perform random access on the target antenna panel used when receiving downlink information (for example, the downlink reference signal and/or the downlink control signaling) sent by the base station antenna panel where the radio link failure or the beam failure occurs. The serving base station sends the radio link recovery instruction or the beam recovery instruction to the terminal, in which the radio link recovery instruction or the beam recovery instruction may include indication information of the target antenna panel.

Optionally, the radio link recovery instruction or the beam recovery instruction may be a Radio Resource Control (RRC) signaling, a MAC CE signaling or a downlink control information (DCI) signaling, which is not limited in embodiments of the present disclosure.

At step 403, the terminal determines the target antenna panel and/or the target beam for sending the random access preamble based on the radio link recovery instruction or the beam recovery instruction.

After receiving the radio link recovery instruction or the beam recovery instruction, the terminal can determine the target antenna panel and/or the target beam for sending the random access preamble based on this, and then send the random access preamble to the serving base station with the target antenna panel and/or the target beam, thereby initiating random access.

For the scenario (3), random access in the radio link failure scenario or the beam failure scenario is achieved, and a wireless link or a beam is recovered.

For the scenario (4), the random access indication signaling is a secondary cell adding instruction configured to instruct the terminal to access a target secondary cell. Optionally, the secondary cell adding instruction includes indication information of the target antenna panel and/or the target beam, so that the terminal initiates random access to the target base station (such as a base station to which the target secondary cell belongs) with the target antenna panel and/or the target beam, to access the target secondary cell.

As illustrated in FIG. 5, for the scenario (4), the method for random access indication provided in embodiments of the disclosure may include the following steps 501~503.

At step 501, the terminal sends a neighboring cell measurement report to the serving base station.

Optionally, the neighboring cell measurement report includes a measurement report of at least one neighboring cell. The measurement report of the neighboring cell is configured to indicate the radio signal quality of the neighboring cell. The measurement report of the neighboring cell may include: an identifier of the neighboring cell, a measurement value of the neighboring cell, and measurement object information. For the measurement report of the neighboring cell, reference may be made to the above descriptions, which is not repeated here.

At step 502, the serving base station selects the target secondary cell from the at least one neighboring cell.

Optionally, the serving base station selects a neighboring cell with the optimal radio signal strength as the target secondary cell, based on the measurement values of respective neighboring cells.

At step 503, the serving base station sends the secondary cell adding instruction to the terminal.

The secondary cell adding instruction is configured to instruct the terminal to access the target secondary cell. Optionally, the secondary cell adding instruction includes an identifier of the target secondary cell. Optionally, the secondary cell adding instruction further includes indication information of the target antenna panel and/or the target beam. For the form of the indication information of the target antenna panel and/or the target beam, reference may be made to descriptions in the above embodiments, which is not repeated here.

At step 504, the terminal determines the target antenna panel and/or the target beam for sending the random access preamble based on the secondary cell adding instruction.

After receiving the secondary cell adding instruction, the terminal can determine the target secondary cell to which random access is initiated, and determine the target antenna panel and/or the target beam for sending the random access preamble, and send the random access preamble to the base station to which the target secondary cell belongs with the target antenna panel and/or the target beam, thereby initiating random access.

For the scenario (4), the selection of the antenna panel is achieved when the terminal accesses the secondary cell, so that the terminal initiates random access to the secondary cell with a suitable antenna panel, thereby improving a success rate of accessing the secondary cell.

It should be noted that, in the above method embodiments, the technical solution in the disclosure is described from the perspective of interaction between the terminal and the serving base station. The steps executed by the terminal may be independently implemented as a method for random access indication at a terminal side, and the steps executed by the serving base station may be independently implemented as a method for random access indication at a serving base station side.

The apparatus embodiments of the disclosure may be configured to execute the method embodiments of the disclosure. For the undisclosed details in apparatus embodiments of the disclosure, reference may be made to method embodiments of the disclosure.

FIG. 6 is a block diagram illustrating an apparatus for random access indication according to an example embodiment. The apparatus has functions for implementing the above method example on the serving base station side, which may be implemented by hardware or by hardware executing the corresponding software. The apparatus may be the above serving base station, or may be set in the serving base station. As illustrated in FIG. 6, the apparatus 600 may include an indication signaling sending module 601.

The indication signaling sending module 601 is configured to send a random access indication signaling, in which the random access indication signaling is configured to indicate to a terminal a target antenna panel and/or a target beam for sending a random access preamble.

In an example embodiment, the random access indication signaling is a handover instruction, and the handover instruction is configured to instruct the terminal to hand over to a target cell.

Figure 7:
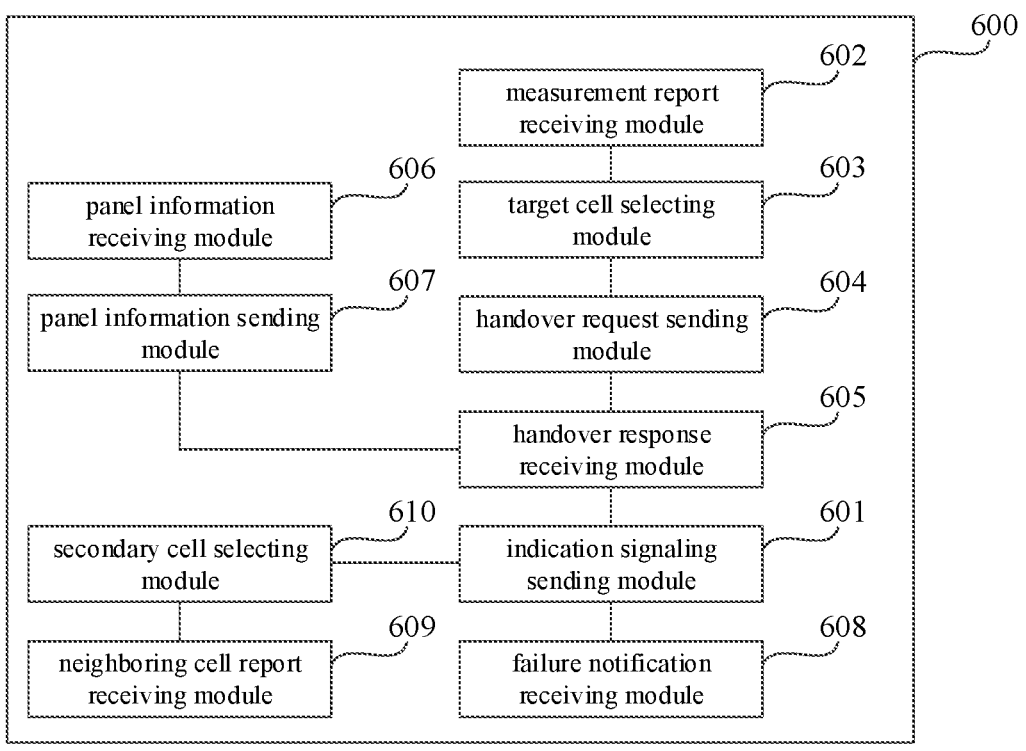
FIG. 7 is a block diagram illustrating an apparatus for random access indication according to another example embodiment.

In an example embodiment, as illustrated in FIG. 7, the apparatus 600 further includes: a measurement report receiving module 602, a target cell selecting module 603, a handover request sending module 604 and a handover response receiving module 605.

The measurement report receiving module 602 is configured to receive an RRM measurement report sent by the terminal, in which the RRM measurement report includes a measurement report of at least one neighboring cell.

The target cell selecting module 603 is configured to select the target cell from the at least one neighboring cell.

The handover request sending module 604 is configured to send a handover request signaling to a target base station to which the target cell belongs, in which the handover request signaling includes a measurement report of the target cell.

The handover response receiving module 605 is configured to receive a handover response signaling sent by the target base station, in which the handover response signaling includes indication information of the target antenna panel and/or the target beam.

In an example embodiment, the measurement report of the neighboring cell includes: an identifier of the neighboring cell, a measurement value of the neighboring cell, and measurement object information. The measurement object information is configured to indicate a receiving antenna panel and/or a receiving beam used by the terminal to obtain the measurement value of the neighboring cell.

In an example embodiment, the measurement object information includes: an identifier of the receiving antenna panel and/or an identifier of the receiving beam; or, an identifier of the receiving antenna panel and/or a first reference signal identifier, in which the first reference signal identifier is configured to indicate the receiving beam; or, a first reference signal group identifier and/or a first reference signal identifier, in which the first reference signal group identifier is configured to indicate the receiving antenna panel, and the first reference signal identifier is configured to indicate the receiving beam; or, a first reference signal identifier, in which the first reference signal identifier is configured to indicate the receiving antenna panel and/or the receiving beam.

In an example embodiment, the handover request signaling further includes configuration information of an uplink reference signal used by the terminal for uplink measurement.

In an example embodiment, as illustrated in FIG. 7, the apparatus 600 further includes: a panel information receiving module 606 and a panel information sending module 607.

The panel information receiving module 606 is configured to receive candidate panel information sent by the terminal, in which the candidate panel information is configured to indicate at least one candidate antenna panel for random access.

The panel information sending module 607 is configured to send the candidate panel information to the target base station. The target antenna panel is selected from the at least one candidate antenna panel.

In an example embodiment, the random access indication signaling is a radio link recovery instruction or a beam recovery instruction.

In an example embodiment, as illustrated in FIG. 7, the apparatus 600 further includes: a failure notification receiving module 608.

The failure notification receiving module 608 is configured to receive a radio link failure notification or a beam failure notification sent by the terminal, in which the radio link failure notification is configured to notify the serving base station of a base station antenna panel where a radio link failure occurs, and the beam failure notification is configured to notify the serving base station of a base station antenna panel where a beam failure occurs.

In an example embodiment, the random access indication signaling is a secondary cell adding instruction, and the secondary cell adding instruction is configured to instruct the terminal to access a target secondary cell.

In an example embodiment, as illustrated in FIG. 7, the apparatus 600 further includes: a neighboring cell report receiving module 609 and a secondary cell selecting module 610.

The neighboring cell report receiving module 609 is configured to receive a neighboring cell measurement report sent by the terminal, in which the neighboring cell measurement report includes a measurement report of at least one neighboring cell.

The secondary cell selecting module 610 is configured to select the target secondary cell from the at least one neighboring cell.

In an example embodiment, the random access indication signaling includes: an identifier of the target antenna panel and/or an identifier of the target beam; or, an identifier of the target antenna panel and/or a second reference signal identifier, in which the second reference signal identifier is configured to indicate the target beam; or, a second reference signal group identifier and/or a second reference signal identifier, in which the second reference signal group identifier is configured to indicate the target antenna panel, and the second reference signal identifier is configured to indicate the target beam; or, a second reference signal identifier, in which the second reference signal identifier is configured to indicate the target antenna panel and/or the target beam.

In an example embodiment, the random access indication signaling further includes indication information of an antenna panel and/or a beam configured to monitor an RAR after the terminal sends the random access preamble.

In summary, in the technical solution provided in embodiments of the disclosure, the serving base station sends the random access indication signaling to the terminal, so that the terminal can determine the target antenna panel and/or the target beam for sending the random access preamble. Accordingly, in this way, when the terminal has a plurality of antenna panels, the terminal can accurately determine which antenna panel is used to initiate random access, thereby improving the accuracy and success rate of random access, and reducing the delay of random access.

Figure 8:
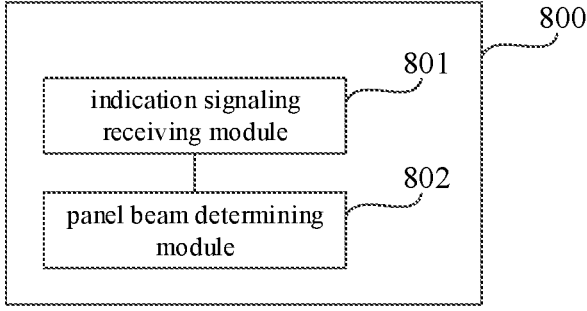
FIG. 8 is a block diagram illustrating an apparatus for random access indication according to another example embodiment.

FIG. 8 is a block diagram illustrating an apparatus for random access indication according to another example embodiment. The apparatus may have functions for implementing the above method example on the terminal side, which may be implemented by hardware, or by hardware executing the corresponding software. The apparatus may be the above terminal, or may be set in the terminal. As illustrated in FIG. 8, the apparatus 800 may include an indication signaling receiving module 801 and a panel beam determining module 802.

The indication signaling receiving module 801 is configured to receive a random access indication signaling.

The panel beam determining module 802 is configured to determine a target antenna panel and/or a target beam for sending a random access preamble based on the random access indication signaling.

In an example embodiment, the random access indication signaling is a handover instruction, and the handover instruction is configured to instruct the terminal to hand over to a target cell.

Figure 9:
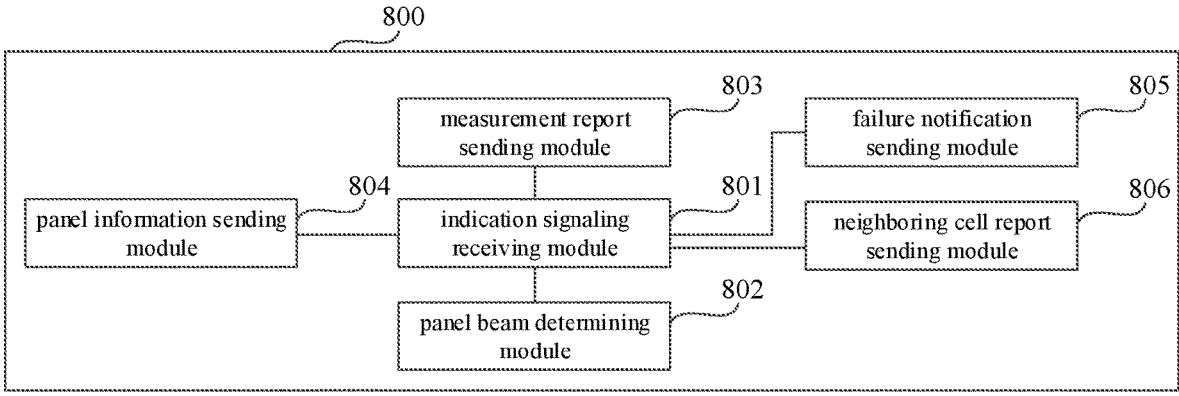
FIG. 9 is a block diagram illustrating an apparatus for random access indication according to another example embodiment.

In an example embodiment, as illustrated in FIG. 9, the apparatus 800 further includes: a measurement report sending module 803.

The measurement report sending module 803 is configured to send a radio resource management (RRM) measurement report to a serving base station, in which the RRM measurement report includes a measurement report of at least one neighboring cell.

The measurement report of the neighboring cell includes: an identifier of the neighboring cell, a measurement value of the neighboring cell, and measurement object information. The measurement object information is configured to indicate a receiving antenna panel and/or a receiving beam used by the terminal to obtain the measurement value of the neighboring cell.

In an example embodiment, as illustrated in FIG. 9, the apparatus 800 further includes: a panel information sending module 804.

The panel information sending module 804 is configured to send candidate panel information to the serving base station. The candidate panel information indicates at least one candidate antenna panel for random access. The target antenna panel is selected from the at least one candidate antenna panel.

In an example embodiment, the random access indication signaling is a radio link recovery instruction or a beam recovery instruction.

In an example embodiment, as illustrated in FIG. 9, the apparatus 800 further includes: a failure notification sending module 805.

The failure notification sending module 8052 is configured to send a radio link failure notification or a beam failure notification to a serving base station, in which the radio link failure notification is configured to notify the serving base station of a base station antenna panel where a radio link failure occurs, and the beam failure notification is configured to notify the serving base station of a base station antenna panel where a beam failure occurs.

In an example embodiment, the random access indication signaling is a secondary cell adding instruction, and the secondary cell adding instruction is configured to instruct the terminal to access a target secondary cell.

In an example embodiment, as illustrated in FIG. 9, the apparatus 800 further includes: a neighboring cell report sending module 806.

The neighboring cell report sending module 806 is configured to send a neighboring cell measurement report to a serving base station, in which the neighboring cell measurement report includes a measurement report of at least one neighboring cell. The target secondary cell is selected from the at least one neighboring cell.

In summary, in the technical solution provided in embodiments of the disclosure, the serving base station sends the random access indication signaling to the terminal, so that the terminal can determine the target antenna panel and/or the target beam for sending the random access preamble. Accordingly, in this way, when the terminal has a plurality of antenna panels, the terminal can accurately determine which antenna panel is used to initiate random access, thereby improving the accuracy and success rate of random access, and reducing the delay of random access.

It should be noted that, when the apparatus provided in the above embodiments implements its function, the division of the above function modules is only illustrative. In practical applications, the above functions may be allocated to different function modules according to actual requirements, that is, the content structure of the apparatus is divided into different function modules to complete all or part of functions described above.

With regard to the apparatus in the embodiments, the specific way in which each module performs the operation has been described in detail in the embodiments of the method and will not be elaborated here.

An example embodiment of the disclosure further provides an apparatus for random access indication. The apparatus may be applied to the above serving base station to implement the method for random access indication on the serving base station side in the disclosure. The apparatus may include a processor and a memory configured to store instructions executable by the processor. The processor is configured to: send a random access indication signaling, in which the random access indication signaling indicates a target antenna panel and/or a target beam for sending a random access preamble to a terminal.

In an example embodiment, the random access indication signaling is a handover instruction, and the handover instruction is configured to instruct the terminal to hand over to a target cell.

In an example embodiment, the processor is further configured to: receive an RRM measurement report sent by the terminal, in which the RRM measurement report includes a measurement report of at least one neighboring cell; select the target cell from the at least one neighboring cell; send a handover request signaling to a target base station to which the target cell belongs, in which the handover request signaling includes a measurement report of the target cell; and receive a handover response signaling sent by the target base station, in which the handover response signaling includes indication information of the target antenna panel and/or the target beam.

In an example embodiment, the measurement report of the neighboring cell includes: an identifier of the neighboring cell, a measurement value of the neighboring cell, and measurement object information. The measurement object information is configured to indicate a receiving antenna panel and/or a receiving beam used by the terminal to obtain the measurement value of the neighboring cell.

In an example embodiment, the measurement object information includes: an identifier of the receiving antenna panel and/or an identifier of the receiving beam; or, an identifier of the receiving antenna panel and/or a first reference signal identifier, in which the first reference signal identifier is configured to indicate the receiving beam; or, a first reference signal group identifier and/or a first reference signal identifier, in which the first reference signal group identifier is configured to indicate the receiving antenna panel, and the first reference signal identifier is configured to indicate the receiving beam; or, a first reference signal identifier, in which the first reference signal identifier is configured to indicate the receiving antenna panel and/or the receiving beam.

In an example embodiment, the handover request signaling further includes configuration information of an uplink reference signal used by the terminal for uplink measurement.

In an example embodiment, the processor is further configured to: receive candidate panel information sent by the terminal, in which the candidate panel information indicates at least one candidate antenna panel for random access; and send the candidate panel information to the target base station. The target antenna panel is selected from the at least one candidate antenna panel.

In an example embodiment, the random access indication signaling is a radio link recovery instruction or a beam recovery instruction.

In an example embodiment, the processor is further configured to: receive a radio link failure notification or a beam failure notification sent by the terminal, in which the radio link failure notification is configured to notify the serving base station of a base station antenna panel where a radio link failure occurs, and the beam failure notification is configured to notify the serving base station of a base station antenna panel where a beam failure occurs.

In an example embodiment, the random access indication signaling is a secondary cell adding instruction, and the secondary cell adding instruction is configured to instruct the terminal to access a target secondary cell.

In an example embodiment, the processor is further configured to: receive a neighboring cell measurement report sent by the terminal, in which the neighboring cell measurement report includes a measurement report of at least one neighboring cell; and select the target secondary cell from the at least one neighboring cell.

In an example embodiment, the random access indication signaling includes: an identifier of the target antenna panel and/or an identifier of the target beam; or, an identifier of the target antenna panel and/or a second reference signal identifier, in which the second reference signal identifier is configured to indicate the target beam; or, a second reference signal group identifier and/or a second reference signal identifier, in which the second reference signal group identifier is configured to indicate the target antenna panel, and the second reference signal identifier is configured to indicate the target beam; or, a second reference signal identifier, in which the second reference signal identifier is configured to indicate the target antenna panel and/or the target beam.

In an example embodiment, the random access indication signaling further includes: indication information of an antenna panel and/or a beam configured to monitor an RAR after the terminal sends the random access preamble.

An example embodiment of the disclosure further provides an apparatus for random access indication. The apparatus may be applied to the above terminal to implement the method for random access indication on the terminal side in the disclosure. The apparatus may include a processor and a memory configured to store instructions executable by the processor. The processor is configured to: receive a random access indication signaling; and determine a target antenna panel and/or a target beam for sending a random access preamble based on the random access indication signaling.

In an example embodiment, the random access indication signaling is a handover instruction, and the handover instruction is configured to instruct the terminal to be handed over to a target cell.

In an example embodiment, the processor is further configured to: send an RRM measurement report to a serving base station, in which the RRM measurement report includes a measurement report of at least one neighboring cell; the measurement report of the neighboring cell includes: an identifier of the neighboring cell, a measurement value of the neighboring cell, and measurement object information, the measurement object information is configured to indicate a receiving antenna panel and/or a receiving beam used by the terminal to obtain the measurement value of the neighboring cell.

In an example embodiment, the processor is further configured to: send candidate panel information to the serving base station, in which the candidate panel information is configured to indicate at least one candidate antenna panel for random access. The target antenna panel is selected from the at least one candidate antenna panel.

In an example embodiment, the random access indication signaling is a radio link recovery instruction or a beam recovery instruction.

In an example embodiment, the processor is further configured to: send a radio link failure notification or a beam failure notification to a serving base station; in which the radio link failure notification is configured to notify the serving base station of a base station antenna panel where a radio link failure occurs, and the beam failure notification is configured to notify the serving base station of a base station antenna panel where a beam failure occurs.

In an example embodiment, the random access indication signaling is a secondary cell adding instruction, and the secondary cell adding instruction is configured to instruct the terminal to access a target secondary cell.

In an example embodiment, the processor is further configured to: send a neighboring cell measurement report to a serving base station, in which the neighboring cell measurement report includes a measurement report of at least one neighboring cell; the target secondary cell is selected from the at least one neighboring cell.

The solution in embodiments of the disclosure is introduced mainly from the perspective of the base station and the terminal. It may be understood that, the base station and the terminal includes hardware structures and/or software modules to perform each function, in order to achieve the function. The units and algorithm steps of the examples described in connection with the embodiments disclosed herein may be implemented by hardware or a combination of hardware and computer software. Whether a certain function is performed by hardware or software depends on particular applications and design constraints of the technical solution. Those skilled in the art may implement the described functions for different particular applications in different ways, however, the implementation should not be considered beyond the scope of the technical solution in embodiments of the disclosure.

Figure 10:
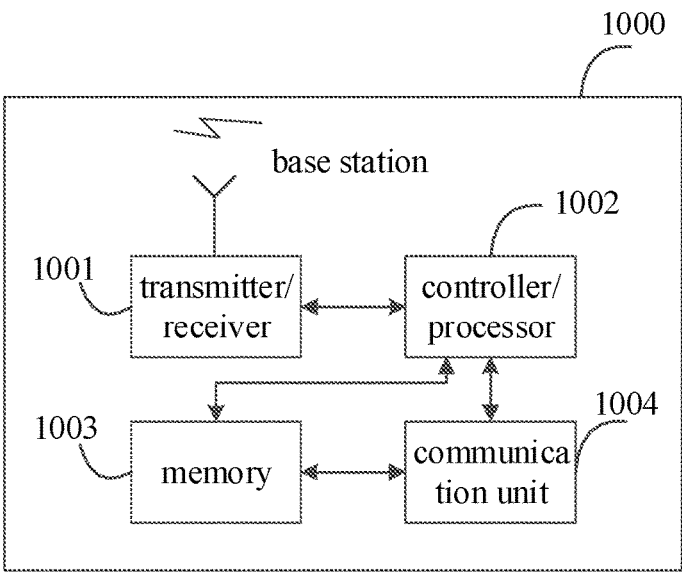
FIG. 10 is a diagram illustrating a structure of a base station according to an example embodiment.

FIG. 10 is a diagram illustrating a structure of a base station according to an example embodiment.

The base station 1000 includes a transmitter/receiver 1001 and a processor 1002. The processor 1002 may also be a controller, and represented as "controller/processor 1002" in FIG. 10. The transmitter/receiver 1001 is configured to support transmitting and receiving information between the base station and the terminal in the above embodiments, and support communication between the base station and other network entities. The processor 1002 executes various functions for communicating with the terminal. On an uplink, the uplink signal from the terminal is received via an antenna and demodulated by the receiver 1001 (for example, the high frequency signal is demodulated into a baseband signal), and further processed by the processor 1002 to recover service data and signaling information sent by the terminal. On a downlink, service data and signaling messages are processed by the processor 1002 and modulated by the transmitter 1001 (for example, the baseband signal is modulated into a high frequency signal) to generate a downlink signal and transmitted to a terminal via an antenna. It should be noted that the above demodulation or modulation functions may also be completed by the processor 1002. For example, the processor 1002 is further configured to execute various blocks at a base station side in the above method embodiments, and/or other blocks of the technical solutions described in embodiments of the present disclosure.

Further, the base station 1000 may further include a memory 1003 configured to store program codes and data of the base station 1000. In addition, the base station may further include a communication unit 1004. The communication unit 1004 is configured to support communication between a base station and other network devices (for example, a network device in a core network, etc.). For example, in a 5G NR system, the communication unit 1004 may be an NG-U interface configured to support a base station and a user plane function (UPF) entity for communication; or, the communication unit 1004 may be an NG-C interface configured to support an access and mobility management function entity for communication.

It may be understood that, FIG. 10 only illustrates a simplified design of the base station 1000. In practical applications, the base station 1000 may include any number of transmitters, receivers, processors, controllers, memories, communication units, etc. and all base stations that may be implement embodiments of the disclosure are within the protection scope of embodiments of the disclosure.

Figure 11:
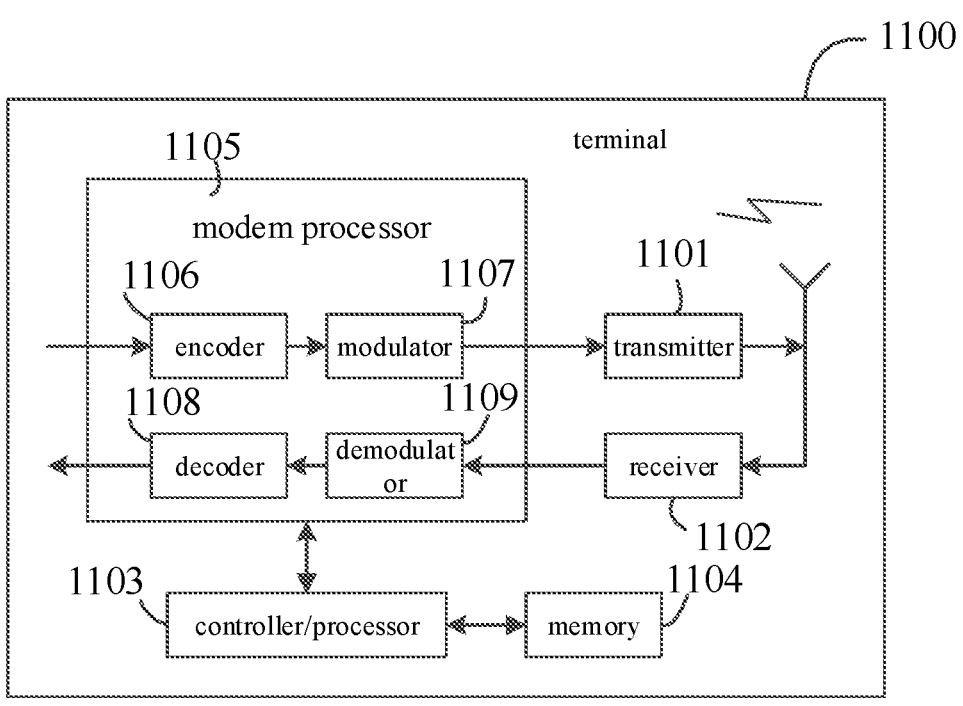
FIG. 11 is a diagram illustrating a structure of a terminal according to an example embodiment.

FIG. 11 is a diagram illustrating a structure of a terminal according to an example embodiment.

The terminal 1100 includes a transmitter 1101, a receiver 1102 and a processor 1103. The processor 1103 may also be a controller, and represented as "a controller/processor 1103" in FIG. 11. Optionally, the terminal 1100 may further include a modem processor 1105 which may include an encoder 1106, a modulator 1107, a decoder 1108, and a demodulator 1109.

In one example, the transmitter 1101 adjusts (for example, analog conversion, filter, amplify, and up-conversion, etc.) the output sample and generates an uplink signal transmitted to a base station via an antenna. On the downlink, the antenna receives a downlink signal transmitted by the base station. The receiver 1102 adjusts (for example, filter, amplify, down-conversion, and digitalize, etc.) signals received from the antenna and provides an input sample. In the modem processor 1105, the encoder 1106 receives service data and signaling messages to be sent on the uplink and processes (for example, format, encode, and interleave) them. The modulator 1107 further processes (for example, symbol mapping and modulation) encoded service data and signaling messages and provides an output sample. The demodulator 1109 processes (for example, demodulate) the input sample and provides symbol estimation. The decoder 1108 processes (for example, deinterleaving and decoding) the symbol estimation and provides decoded data and signaling message sent to the terminal 1100. The encoder 1106, the modulator 1107, the demodulator 1109, and the decoder 1108 may be implemented by a synthetic modem processor 1105. The units are processed based on radio access technologies (for example, 5G NR and access technologies of other evolved systems) employed by the radio access network. It should be noted that, when the terminal 1100 does not include the modem processor 1105, the functions of the modem processor 1105 may also be completed by the processor 1103.

The processor 1103 controls and manages the actions of the terminal 1100, which is configured to execute the processing process executed by the terminal 1100 in the above embodiments of the disclosure. For example, the processor 1103 is further configured to execute various blocks at a terminal side in the above method embodiments, and/or other blocks of the technical solutions described in embodiments of the disclosure.

Further, the terminal 1100 may further include a memory 1104 configured to store program codes and data of the terminal 1100.

It may be understood that, FIG. 11 only illustrates a simplified design of the terminal 1100. In practical applications, the terminal 1100 may include any number of transmitters, receivers, processors, modem processors, memories, etc. and all terminals that may be implement embodiments of the disclosure are within the protection scope of embodiments of the disclosure.

Embodiments of the present disclosure further include a non-transitory computer readable storage medium with computer programs stored thereon. The computer programs are executed by the processor of the serving base station to implement the method for random access indication at the serving base station side.

Embodiments of the present disclosure further include a non-transitory computer readable storage medium with computer programs stored thereon. The computer programs are executed by the processor of the terminal to implement the method for random access indication at the terminal side.

Optionally, the non-transitory computer readable storage medium may be a read-only memory (ROM), a random access memory (RAM), a CD-ROM, a magnetic tape, a floppy disk, an optical data storage device, etc.

It should be understood that, "more" mentioned in this disclosure refers to two or more. "and/or" describes an association relationship of the associated objects, and represents that there may be three relationships, for example, A and/or B, may represent: A exists alone, both A and B exist, and B exists alone. The character "/" generally represents an "or" relationship of the associated objects.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The specification and embodiments are only be illustrative, and the true scope and spirit of the disclosure are indicated by the following claims.

It should be understood that the present disclosure is not limited to the precise structure described above and shown in the drawings, and various modifications and changes may be made without departing from its scope. The scope of the present application is only limited by the appended claims.

What is claimed is:

1. A method for random access indication, comprising:
receiving, by a serving base station, a radio resource management (RRM) measurement report sent by a terminal, wherein the measurement report comprises a measurement report of at least one neighboring cell, the measurement report of the at least one neighboring cell comprises: measurement object information configured to indicate at least one of a receiving antenna panel or a receiving beam used by the terminal to obtain the measurement value of the at least one neighboring cell;
wherein, the measurement object information comprises:
an identifier of the receiving beam; or
a first reference signal identifier, wherein the first reference signal identifier is configured to indicate the receiving beam;
selecting by the serving base station a target cell from the at least one neighboring cell;
sending by the serving base station a handover request signaling to a target base station to which the target cell belongs, wherein the handover request signaling comprises the measurement report of the target cell;
receiving by the serving base station a handover response signaling sent by the target base station, wherein the handover response signaling comprises indication information of at least one of a target antenna panel or a target beam; and
sending, by the serving base station, a random access indication signaling to the terminal, the random access indication signaling configured to indicate to the terminal at least one of the target antenna panel or the target beam for sending a random access preamble,
in response to the random access indication signaling indicating the target beam, the target antenna panel corresponding to the target beam is determined by the terminal based on a mapping relationship between antenna panels and beams;
in response to the terminal having beam correspondence capability, the target antenna panel and the target beam are determined by the terminal as the transmitting antenna panel and transmitting beam corresponding to the receiving antenna panel and receiving beam with optimal downlink signal;
in response to the terminal not having beam correspondence capability, the target antenna panel and the target beam are determined by the target base station based on a measurement value corresponding to each uplink reference signal; and
in response to a radio link failure, the random access indication signaling isa radio link recovery instruction or a beam recovery instruction, wherein the radio link recovery instruction or the beam recovery instruction comprises indication information of a target antenna panel, enabling the terminal to initiate random access to the serving base station using the target antenna panel to perform radio link recovery or beam recovery;
wherein, the random access indication signaling further comprises: indication information of at least one of an antenna panel or a beam configured to monitor a random access response (RAR) after the terminal sends the random access preamble.

2. The method of claim 1, wherein, the random access indication signaling is a handover instruction, and the handover instruction is configured to instruct the terminal to hand over to the target cell.

3. The method of claim 1, wherein, the measurement report of the at least one neighboring cell further comprises: an identifier of the at least one neighboring cell, and a measurement value of the at least one neighboring cell.

4. The method of claim 3, wherein, the measurement object information further comprises:
an identifier of the receiving antenna panel; or,
a first reference signal group identifier, wherein the first reference signal group identifier is configured to indicate the receiving antenna panel; or,
the first reference signal identifier, wherein the first reference signal identifier is configured to indicate the receiving antenna panel.

5. The method of claim 1, wherein, the handover request signaling further comprises configuration information of an uplink reference signal for uplink measurement by the terminal.

6. The method of claim 1, further comprising:
receiving by the serving base station candidate panel information sent by the terminal, wherein the candidate panel information is configured to indicate at least one candidate antenna panel for random access;
sending by the serving base station the candidate panel information to the target base station;
wherein, the target antenna panel is selected from the at least one candidate antenna panel.

7. The method of claim 1, further comprising:
receiving by the serving base station a radio link failure notification or a beam failure notification sent by the terminal;
wherein, the radio link failure notification is configured to notify the serving base station of a base station antenna panel where a radio link failure occurs, and the beam failure notification is configured to notify the serving base station of a base station antenna panel where a beam failure occurs.

8. The method of claim 1, wherein, the random access indication signaling is a secondary cell adding instruction, the secondary cell adding instruction is configured to instruct the terminal to access a target secondary cell.

9. The method of claim 8, further comprising:

selecting by the serving base station the target secondary cell from the at least one neighboring cell.

10. The method of claim 1, wherein, the random access indication signaling comprises:

at least one of an identifier of the target antenna panel or an identifier of the target beam; or, at least one of an identifier of the target antenna panel or a second reference signal identifier, wherein the second reference signal identifier is configured to indicate the target beam; or, at least one of a second reference signal group identifier or a second reference signal identifier, wherein the second reference signal group identifier is configured to indicate the target antenna panel, and the second reference signal identifier is configured to indicate the target beam; or, a second reference signal identifier, wherein the second reference signal identifier is configured to indicate at least one of the target antenna panel or the target beam.

11. A method for random access indication, comprising:

sending by a terminal a radio resource management (RRM) measurement report to a serving base station, wherein the measurement report comprises a measurement report of at least one neighboring cell, wherein, the measurement report of the at least one neighboring cell comprises: measurement object information, the measurement object information is configured to indicate at least one of a receiving antenna panel or a receiving beam used by the terminal to obtain the measurement value of the at least one neighboring cell;

receiving by the terminal a random access indication signaling; and determining by the terminal at least one of a target antenna panel or a target beam for sending a random access preamble and at least one of an antenna panel or a beam configured to monitor a random access response (RAR) after the terminal sends the random access preamble based on the random access indication signaling;

wherein, the measurement object information comprises: an identifier of the receiving beam; or a first reference signal identifier, wherein the first reference signal identifier is configured to indicate the receiving beam;

in response to the random access indication signaling indicating the target beam, the terminal determines the target antenna panel corresponding to the target beam based on a mapping relationship between antenna panels and beams;

in response to the terminal having beam correspondence capability, the terminal determines the target antenna panel and the target beam as the transmitting antenna panel and transmitting beam corresponding to the receiving antenna panel and receiving beam with optimal downlink signal;

in response to the terminal not having beam correspondence capability, the target antenna panel and the target beam are determined by the target base station based on a measurement value corresponding to each uplink reference signal; and in response to a radio link failure, the random access indication signaling is a radio link recovery instruction or a beam recovery instruction, wherein the radio link recovery instruction or the beam recovery instruction comprises indication information of a target antenna panel, the terminal initiates random access to the serving base station using the target antenna panel to perform radio link recovery or beam recovery.

12. The method of claim 11, wherein, the random access indication signaling is a handover instruction, and the handover instruction is configured to instruct the terminal to be handed over to a target cell.

13. The method of claim 12, wherein, the measurement report of the at least one neighboring cell further comprises: an identifier of the at least one neighboring cell, and a measurement value of the at least one neighboring cell.

14. The method of claim 13, further comprising:

sending by the terminal candidate panel information to the serving base station, wherein the candidate panel information indicates at least one candidate antenna panel for random access;

wherein, the target antenna panel is selected from the at least one candidate antenna panel.

15. The method of claim 11, the method further comprises:

sending by the terminal a radio link failure notification or a beam failure notification to a serving base station;

wherein, the radio link failure notification is configured to notify the serving base station of a base station antenna panel where a radio link failure occurs, and the beam failure notification is configured to notify the serving base station of a base station antenna panel where a beam failure occurs.

16. The method of claim 11, wherein, the random access indication signaling is a secondary cell adding instruction, the secondary cell adding instruction is configured to instruct the terminal to access a target secondary cell, the target secondary cell is selected from the at least one neighboring cell.

17. An apparatus for random access indication, applied to a terminal, the apparatus comprising:

a processor; and a memory configured to store instructions executable by the processor;

wherein, the processor is configured to:

send a radio resource management (RRM) measurement report to a serving base station, wherein the measurement report comprises a measurement report of at least one neighboring cell, the measurement report of the at least one neighboring cell comprises: measurement object information, the measurement object information is configured to indicate at least one of a receiving antenna panel or a receiving beam used by the terminal to obtain the measurement value of the at least one neighboring cell, wherein, the measurement object information comprises: an identifier of the receiving beam; or, a first reference signal identifier, wherein the first reference signal identifier is configured to indicate the receiving beam;

receive a random access indication signaling, the random access indication signaling configured to indicate to the terminal at least one of a target antenna panel or a target beam for sending a random access preamble; and determine at least one of the target antenna panel or the target beam for sending a random access preamble and at least one of an antenna panel or a beam configured to monitor a random access response (RAR) after the terminal sends the random access preamble based on the random access indication signaling;

in response to the random access indication signaling indicating the target beam, determine the target antenna panel corresponding to the target beam is based on a mapping relationship between antenna panels and beams;

in response to the terminal having beam correspondence capability, determine the target antenna panel and the target beam as the transmitting antenna panel and transmitting beam corresponding to the receiving antenna panel and receiving beam with optimal downlink signal;

in response to the terminal not having beam correspondence capability, the target antenna panel and the target beam are determined by the target base station based on a measurement value corresponding to each uplink reference signal; and in response to a radio link failure, the random access indication signaling is a radio link recovery instruction or a beam recovery instruction, wherein the radio link recovery instruction or the beam recovery instruction comprises indication information of a target antenna panel, initiate random access to the serving base station using the target antenna panel to perform radio link recovery or beam recovery.

* * * * *